United States Patent [11] 3,615,999

| [72] | Inventors | Robert Basier<br>Saudemont;<br>Clovis Parisot, Douai, both of France |
|---|---|---|
| [21] | Appl. No. | 837,970 |
| [22] | Filed | Apr. 3, 1969 |
| [45] | Patented | Oct. 26, 1971 |
| [73] | Assignee | Societe Anonyme de Recherches et de Commercialisation de Produits de Resines de Synthese R.C.P. and Houilleres du Bassin du Nord et du Pas de Calais Douai (Nord), France<br>Continuation-in-part of application Ser. No. 471,171, July 19, 1965, now abandoned. |

[54] METHOD OF CONSTRUCTING COMPARTMENTED TANKERS
1 Claim, 5 Drawing Figs.

| [52] | U.S. Cl. | 156/172, 220/20, 220/22 |
|---|---|---|
| [51] | Int. Cl. | B65h 81/06 |
| [50] | Field of Search | 156/172, 192; 220/20, 21, 22; 114/74 |

[56] References Cited
UNITED STATES PATENTS

| 1,952,867 | 3/1934 | Jensen | 220/20 |
|---|---|---|---|
| 2,663,450 | 12/1953 | Bourcart | 220/20 X |
| 3,240,644 | 3/1966 | Wolff | 156/172 X |
| 3,251,500 | 12/1967 | Archbold | 156/172 X |

Primary Examiner—Carl D. Quarforth
Assistant Examiner—E. E. Lehmann
Attorney—Ernest G. Montague ABSTRACT: A method of producing compartmented tankers from laminated resins, in which the tankers include tubular elements of substantially identical cross section and of cylindrical shape with one end open, which comprises the steps of assembling the tubular elements to fit hermetically into each other in the same direction over a limited depth, to form separate compartments. The compartments are first molded of polyester resin and covered with glass fiber. The glass is present at the order of about 50 percent. The polyester is non-saturated and has catalyzers and accelerators added thereto. The polymerization is performed at first at an ambient temperature and terminates then by heating to about 80° C, in order to obtain a total reticulation. The assembly step is performed by moistening that part of the tubular elements in contact with each other with glue of the same polyester resin catalyzed and accelerated as applied before. The last one of the elements is hermetically closed towards the outside by an end member.

PATENTED OCT 26 1971 3,615,999

INVENTORS
Robert Baner
Clovis Parisot
BY Ernest Chantagne
 abourney

INVENTORS
ROBERT BASIER
CLOVIS PARISOT

METHOD OF CONSTRUCTING COMPARTMENTED TANKERS

This is a continuation-in-part application to the copending patent application Ser. No. 471,171, filed July 19, 1965, now abandoned.

The present invention relates to a method of constructing compartmented tankers from laminated resins. It also relates to the tankers produced by this process.

Tankers made of laminated resins have hitherto been made in a way similar to metal tankers, more particularly by a construction employing welded hoops, ends and wave baffles. The results have not been satisfactory and it has in particular been found that the inner partitions or wave baffles become detached and leakage occurs at places because of imperfect sticking of the ends to the rings. An attempt has been made to obviate this disadvantage by the use of rings which fit over the edges of curved ends—which are molded separately—by means of a recess over a specific length terminating in a shoulder, the assembly forming a core which is then completely covered with a layer of resin. This type of production requires machining of the edges of the ends and of the rings, and this is not a simple task, unless the sections are circular; it also weakens these edges which have to take considerable stresses; finally, this production process does not enable wave baffles or internal partitions to be securely fixed to the outer walls of the tanker.

Where strength reasons make it essential to make the partitions and wave baffles rigid with the wall in the first stage of manufacture, it becomes impossible to dispose inside the tanker a core which will be withdrawn after a layer of glass fabric incorporated in resin has been wrapped round the same. Large hollow articles made from reinforced plastics are made by applying material in various layers to a detachable former or mandrel, the material used being for example polyester, together with a reinforcement which is generally glass fabrics or mats. This production process gives best results for the manufacture of hollow bodies. Tankers which are intended to contain food products must be annealed for several hours and this gives rise to complex problems with large tankers, because it is not an easy job to find an oven capable of holding them.

In some cases it has been found that plastics suitable for the production of tankers chemically withstand some of the products that they have to contain to a varying degree. Corrosive products, such as some concentrated acids, may ultimately affect the walls. With some food products, for example milk, the surface condition of the walls in contact must be extremely smooth and durable to prevent any growth of germs and bacteria; no matter how well made plastics walls are, their structure necessarily results in scaling and microscopic fissures in which micro-organisms can develop without being readily detached with conventional means, even the most modern means used with metal tankers for example.

It is one object of the present invention to provide compartmented tankers from laminated resins, which obviates the above disadvantages, and more particularly to enable a tanker to be produced by covering a core and annealing of the tanker in the nonassembled state.

According to the invention, the compartmented tanker is characterized in that cells, tubular casings or elements of identical cross section which may or may not be circular, and which are of cylindrical shape with one end open, are so assembled that they fit hermetically in the same direction one inside the other over a limited depth to make up compartments, the last compartment being hermetically sealed from the exterior by an end, such elements being relatively thin and made from a material which is chemically and mechanically resistant to the products that the tanker may contain, and forming a core which is then covered with a covering layer of a glass-resin complex which consolidates it, the resultant assembly forming a mechanically homogeneous whole.

The cells, tubular casings or elements preferably have a curved end or a shape giving them a greater rigidity and, near the place where such end is connected to their sidewall, have a recess terminating in a shoulder intended to fit perfectly against the inner edge of the sidewall of the adjacent tubular casing or element, such recess and shoulder forming a rebate.

Some of the tubular casings or elements have their end apertured, so that two adjacent compartments can communicate, the apertured ends thus constituting wave baffles.

The length of the tubular casings, elements or cells may vary to form compartments of different volumes.

According to a preferred embodiment of the present invention, the core is covered with a layer of a glass-resin complex which may have a required shrinkage on drying, such shrinkage generally being accompanied by polymerization of the resin to hoop the core to prestress the tanker walls.

The wall has an excess thickness at the rebate and this reinforced place is chosen for anchoring the tanker, for example by means of a strap.

With these and other objects in view, which will become apparent in the following detailed description, the present invention will be clearly understood in connection with the accompanying drawings, in which.

Figure 1:
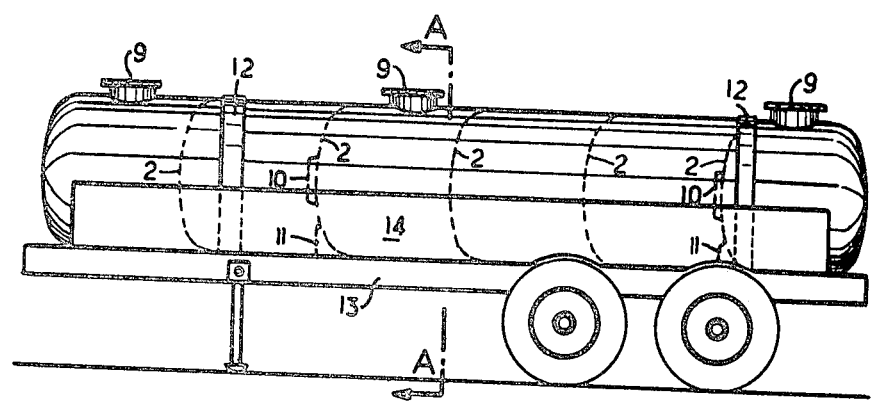
FIG. 1 is a side view of the tanker on a semitrailer chassis; broken lines being used to denote the compartments formed by the cells.
Figure 2:
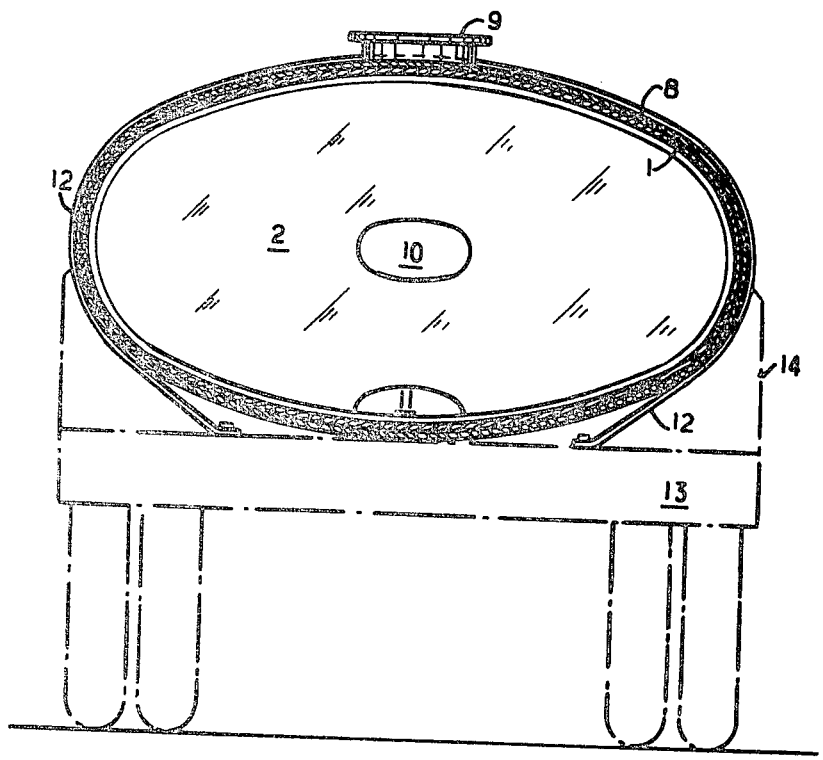
FIG. 2 is a cross section of the tanker along the line FIG. 1.
Figure 3:
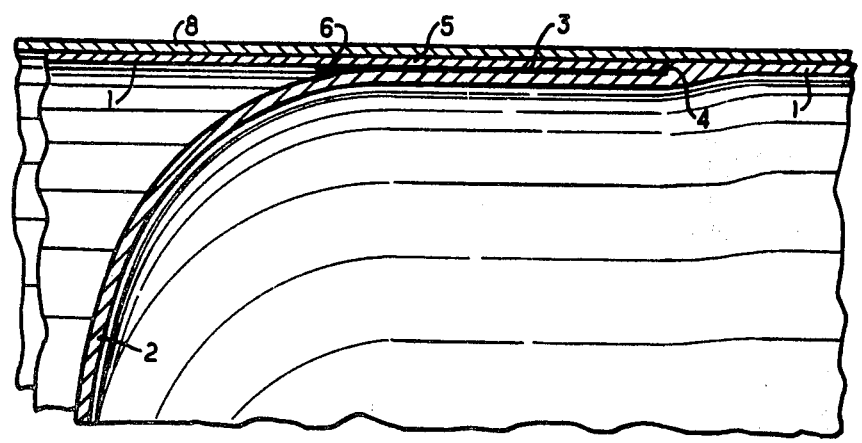
FIG. 3 is a detail in section showing the connection between two cells at the rebate.
Figure 4:
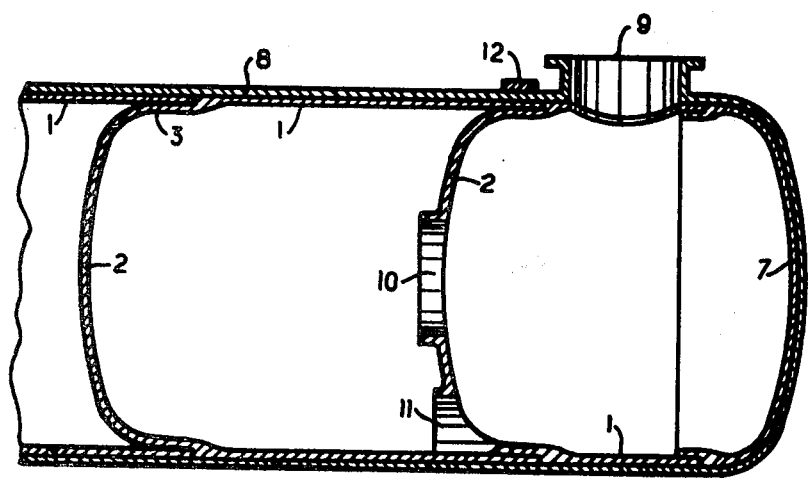
FIG. 4 is a partial section of the tanker showing its internal arrangement.
Figure 5:
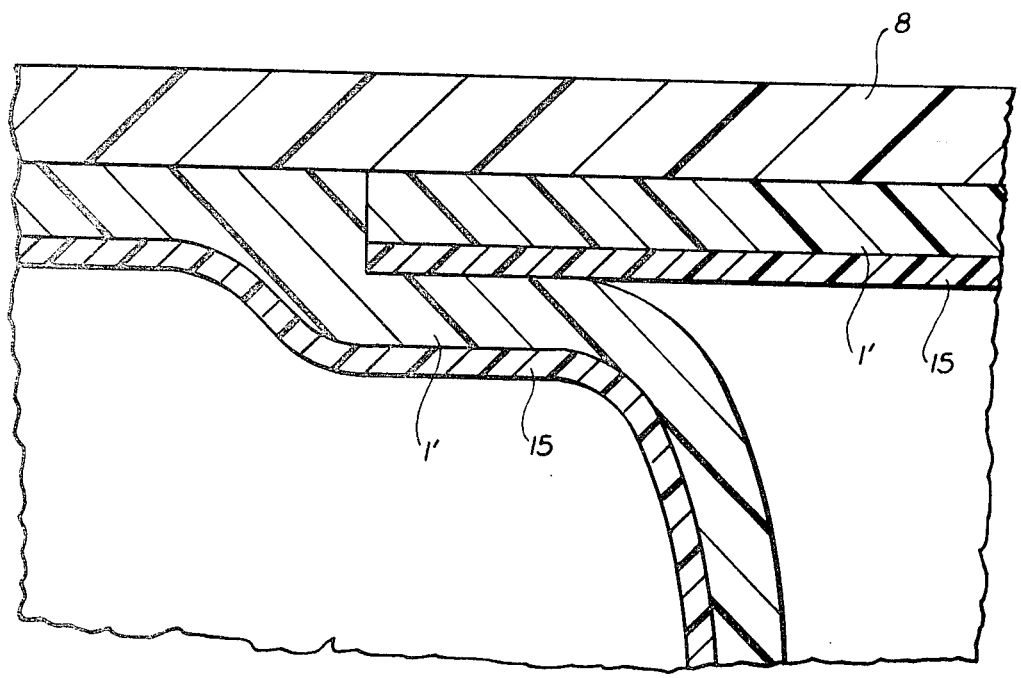
FIG. 5 is a detail in section of another embodiment of the arrangement of the cells.

Referring now to the drawings, the tanker is made up of cells, tubular casings or compartments 1 of cylindrical shape open at one end, all having the same cross-section, preferably having a rebate and differing if at all in respect of their depth, to make up tanker compartments of different volumes. The closed end 2 of these elements 1 is generally curved. Some of these elements 1 may have an end formed with apertures 10, 11, so that two adjacent compartments 1 of the tanker can communicate. The elements 1 may also have a manhole 9 and filling and emptying apertures. Near the place where the end 2 is connected to the wall of the cell or element 1, the wall has on the outside a recess 3 terminating in a shoulder 4. This recess 3 forms the rebate and is intended exactly to receive the edge 5 of the adjacent cell, so that the outer surfaces of the two cells do not project from one another and are perfectly flush.

The cells, tubular casings or elements 1 are either of metal or of a glass-resin complex, and their wall is thicker, particularly at the site of the rebate.

To construct the tanker, the elements 1 are interfitted in the required number and arrangement according to the required tanker capacities and compartments, so that the edge of each element 1 is suitably located on the rebate of the next compartment, to which it is secured so as to be fluid-tight. This is achieved by continuous gluing in the case of resin elements 1, or by a continuous weld in the case of metal elements 1. The last element, which is open to the exterior, is closed by an end 7 of appropriate way. The outer edge of this end 7 preferably also has a rebate. The system made up of the elements 1 and end after assembly forms a core which would not be strong enough for practical use of the tanker.

The core is then covered by a layer of a glass-resin complex consisting, for example, of wisps and threads of glass coated with a polyester resin identical with that of the core.

The place where the ends 2 are connected to the outer wall of the tanker at the site of the rebate is thicker than the rest of the tanker and is more resistant to the radial stresses because of the presence of the ends 2. This place is chosen as the location for straps 12 to anchor the tanker to the chassis 13 or any other mechanical component used for transportation or handling of the tanker. Preferably, the tanker will rest on a cradle shown diagrammatically at 14, at this place.

Low-level points are formed at the bottom of some of the compartments by deformation of the wall in order to facilitate complete emptying of the tanker.

For the production of such a tanker, the first production operation is to make the cells or elements 1. For this purpose a mold of the required shape is externally lined with a glass-resin complex, and plugs corresponding to the manhole 9, emptying aperture, and the apertures 10 and 11 in the ends 2 are fitted in the mold. The mold is lined over the required length depending on the required width of the cell. Appropriate conventional processes are applied in order exactly to form the recess 3 and shoulder 4 to make the rebate. Similarly, the edge 5 of the cell is exactly molded, so that it will fit exactly in the rebate of the adjacent element.

The utilized resin is a polyester resin and one utilizes a layer of glass at a proportion of about 50 percent of the total thickness. The polyester is not saturated and catalysts and accelerators, as it is known, are added.

The second production operation consists of the polymerization, which is of a duration of several hours and is performed at first at ambient temperature and then terminated at about 80° C. in a stove, in order to obtain a total reticulation. The mold being smooth, one obtains cells or compartments 1 with an excellent interior surface, which could not be obtained, if the complex of resin is rolled directly over the mold serving as a core.

The third production operation in the case of resin elements 1 is to coat each rebate with an appropriate glue which is the same polyester resin used in the manufacture of the cells, which is catalyzed and accelerated and fit the cells one inside the other, and the end 7, to make up the tanker core, whose elements are exactly glued over a relatively large area to ensure sealing tightness.

The last operation comprises coating exteriorly the core with a layer of glass fabric, filaments or fibers impregnated with the same polyester resin. The coating is performed with constant tension and the proportion of glass is more important than before, namely about 80 percent. The polyester resin is catalyzed and its reticulation is obtained in a stove by heating to a superior temperature of about 100° C. This coating may be carried out with a machine on which the complete tanker rotates about its major axis, so as to wrap the glass-resin complex thereon. These machines are generally designed to make hollow bodies about a retractable core which is withdrawn when the body is complete. In the present case no core is required, since the interfitted and connected cells themselves constitute the core, after drying the resin will have a required shrinkage which can be predetermined by the composition of the resin; in this way the glass-resin complex covering will enclose the entire core and the walls of the tanker will be prestressed and have a greater strength. During the covering operation conventional steps are taken to provide the apertures, more particularly the manholes 9. The total thickness of the walls of a tanker made in this way may be of the order of one centimeter.

In accordance with the present invention, in another embodiment each of the cells are equipped with a liner 15 preferably made of pure 100 percent resins, while the cells are preferably about 20 percent of glass fibers and 80 percent resins. The outer member 8 is preferably made of about 20 percent resins and about 80 percent glass fibers. The liner 15, if chosen of particular material, permits the use of the tanker for food material or any other material.

As compared with metal tankers made from light alloys or special steels, the tankers according to the present invention are of a much lower cost price and weight. As compared with existing laminated resin tankers, the tankers according to the present invention are stronger and more rigid, more particularly because of the hooping effect provided by the outer covering; in particular, there is no danger of the internal partitions working themselves loose. The junction points of the elements 1 which might tend to be weak are situated at the strongest places of the tanker: i.e., at the place where the partitions and wave baffles are situated. This type of construction avoids any reduction of the thickness of the edges of the elements 1. Also, the use of prefabricated cells makes the production much faster and more flexible for the production of tankers of various volumes on request. Also, resin elements intended to contain foodstuffs can readily be annealed. The inner coating of these tankers may be so selected as chemically to withstand the various substances they will contain and to have a surface condition suitable for the requirements of all food products. Finally, these tankers can be made on machines for covering hollow bodies with a core remaining captive in the material.

While we have disclosed several embodiments of the present inventions it is to be understood that these embodiments are given by example only and not in a limiting sense.

We claim:

1. A method of producing compartmented tankers from laminated resins, comprising tubular elements of substantially identical cross section and cylindrical shape with one end open, comprising the steps of assembling said tubular elements to fit hermetically into each other in the same direction over a limited depth to form separate compartments, molding first said compartments of polyester resin and coated with glass fiber, said glass fiber being present in the order of about 50 percent, said polyester being nonsaturated and having catalyzers and accelerators added thereto, performing the polymerization at first at an ambient temperature and then terminating by heating to about 80° C., in order to obtain a total reticulation, performing said molding step by moistening that part of said tubular elements in contact with each other with glue of the same polyester resin catalyzed and accelerated, closing the last one of said elements hermetically towards the outside by an end member, and providing an exterior winding of filaments under constant tension formed directly by means of a core of glass fibers impregnated with the same catalyzed polyester, retaining the reticulation at 100° C. minimum, the amount of glass being of the order of 80 percent, whereby the wall of the body being constituted by at least two layers, the outer of said layers being subjected to tension and the internal of said layers being subjected to compression.

* * * * *